JAMES M. CLARK.

Improvement in Washing Machines.

No. 4,717. Reissued Jan. 23, 1872.

ATTEST:

Walter Allen

Wm. N. Brereton Jr.

INVENTOR.

James M. Clark

By Knight Bros

Attorneys.

AM. PHOTO-LITHOGRAPHIC CO. N.Y. (OSBORNE'S PROCESS.)

UNITED STATES PATENT OFFICE.

JAMES M. CLARK, OF LANCASTER, ASSIGNOR TO FRANKLIN L. CLARK, OF CLARKSVILLE, PENNSYLVANIA.

IMPROVEMENT IN WASHING-MACHINES.

Specification forming part of Letters Patent No. 117,603, dated August 1, 1871; reissue No. 4,717, dated January 23, 1872.

DIVISION A.

Specification describing certain Improvements in Washing-machines, invented by JAMES M. CLARK, of the city and county of Lancaster, State of Pennsylvania.

My machine is constructed with a series of vertical cogged beaters, operated by mutilated or segment cog-wheels, so as to be raised and allowed to fall upon the clothes which are placed upon a perforated board or false-bottom in a tub in which the beaters work. The tub is set upon a platform or table, which may be revolved by gearing, which connects it with the shaft onto which the segment-wheels are attached.

Figure 1:
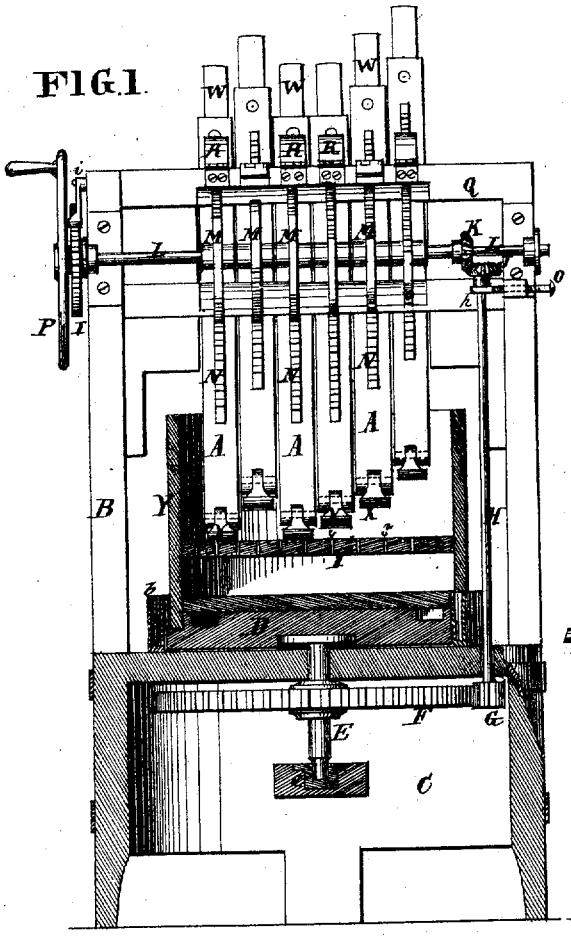
Figure 2:
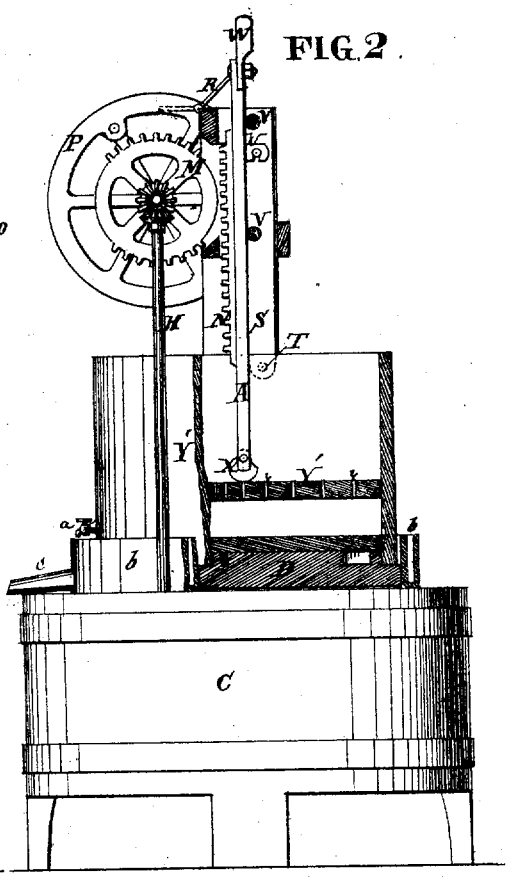
Figure 3:
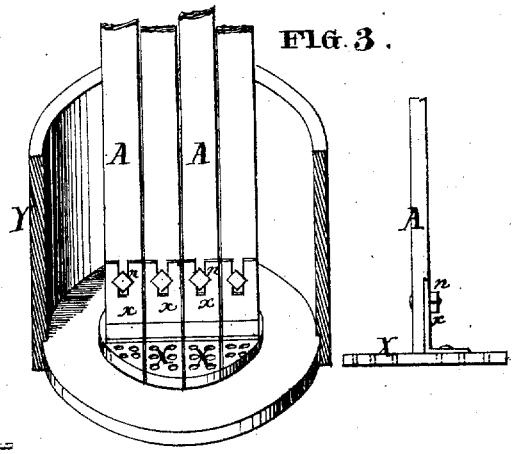
Figure 4:
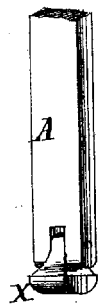

In the drawing, Figure 1 is a sectional elevation of the machine looking from the front. Fig. 2 is an end elevation, partly in section. Fig. 3 is a sectional perspective view illustrating a modification in the form of the beater-feet. Fig. 4 is a perspective view, on a larger scale, of the lower end of a beater such as shown in operation in Figs. 1 and 2.

A A are a series of beaters, (six, more or less, in number,) guided in a vertical frame, B, the bed C of which supports a rotating platform, D, the upper surface of which is formed with a number of concentric annular grooves to adapt it to receive a tub, Y, of any necessary size or construction. The rotation of the platform D is effected by means of a shaft, E, upon which is keyed a cog-wheel, F, driven by a pinion, G, upon a vertical shaft, H, which latter is geared, at its upper end, by wheels J K to the horizontal driving-shaft L. This shaft may be turned by a crank-wheel, P, or by a band-pulley, or other equivalent means. The said shaft carries a series of mutilated or segment cog-wheels, M, one for each of the beaters A, the cogged segments gearing with racks N attached to the said beaters. The periphery of each wheel M is divided into four sections, consisting of two toothed segments, and two toothless spaces, as clearly shown in Fig. 2. By this device each beater is raised and permitted to fall twice by each revolution of the shaft L. *i* is a pawl, which may be thrown onto the ratchet-wheel I, either to prevent its reverse motion or to hold it when the apparatus is used for pressing or squeezing, which is effected by turning the shaft in the reverse direction. R are dogs hinged to the cross-beam Q of the frame, and adapted to be thrown into gear with the racks N. These will then retain the respective beaters in the highest position to which they may be raised. Any one, or more, or all of the said beaters may thus be instantly thrown out of action while the shaft L continues to run. S (Fig. 2) is a frame pivoted, at T, to the main frame B, and secured above by hooks or catches U. The said frame carries friction-rollers V V by which the beaters are guided and supported at back so as to keep the racks in gear with the cogged segments of the wheels M. By releasing the frame S from the catches U it may be turned down so as to release the beaters A, and permit any of them to be taken out and reversed, if necessary, in order to bring their other ends into action. W W represent weights, of any necessary amount, which may be attached to the beaters A to increase their power. The said weights are slotted and attached removably by screw-bolts, as shown. For washing purposes I employ pivoted feet X, as shown in Fig. 4, in order to adapt them to roll upon the surface of the clothes at the moment of impact, thus producing a very effective squeezing action at each stroke, but causing no destructive friction upon the clothes as the tub revolves. The tub is made, as shown, with a perforated or grated false bottom, the space between this and the true bottom being occupied with water, which is discharged, when desired, through a faucet, *a*, into an annular trough, *b*, in the stationary bed C. From this trough the water is conducted off by a pipe, *c*.

This is a very effective arrangement for rinsing purposes, permitting a flow of clean water to be maintained through the apparatus for any length of time, while the action of the beaters is continued. The machine is valuable for washing wool, fulling, and other operations on a large scale.

I claim as my invention—

1. The combination of the segment cog-wheels M on the shaft L, the beaters A, provided with racks N, and the revolving tub Y, all constructed and arranged to operate as herein set forth.

2. The beaters A, provided with pivoted feet X, constructed substantially as and for the purposes explained.

3. The combination of the beaters A, racks N, segment wheels M, shafts L H, gearing J K G F, revolving platform D, and tub Y, for the purposes set forth.

4. The endless trough *b*, in combination with the revolving platform and tub Y.

5. The perforated false bottom *y*, in combination with the revolving tub Y and reciprocating beaters A, as and for the purposes explained.

JAMES M. CLARK.

Witnesses:
OCTAVIUS KNIGHT,
WALTER ALLEN.